Patented Jan. 2, 1934

1,942,346

UNITED STATES PATENT OFFICE 1,942,346

PROCESS FOR THE MANUFACTURE OF CELLULOSE SOLUTIONS

Emil Scheller, Lorsbach, Germany, assignor to Deutsche Gold- und Silber-Scheide-Anstalt Vormals Roessler, Frankfort-on-the-Main, Germany, a corporation No Drawing. Original application November 22, 1929, Serial No. 409,195, and in Germany November 26, 1928. Divided and this application January 29, 1932. Serial No. 589,772

7 Claims. (Cl. 106—40)

This application is a division of pending application Serial No. 409,195, filed November 22, 1929.

The present invention relates to processes for preparing cellulose solutions and has particular reference to a process wherein cellulose is dissolved in alkali solutions. Such cellulose solutions are widely used in the manufacture of artificial silk, and similar purposes, wherein the viscosity of the solution is of considerable importance.

It has long been appreciated that solutions of cellulose in an alkaline medium are extremely sensitive to oxygen. Thus, solutions of cellulose in ammoniacal copper hydroxide or as cellulose xanthate (xanthogenate) solutions are most sensitive to even small amounts of oxygen. The sensitivity of the solutions occurs when the oxygen is present in extremely small amounts and irrespective of its precise form, which may be active or nascent, such as in hydrogen peroxide ($H_2O_2$), sodium peroxide ($Na_2O_2$), or metal persulphates.

Experiments have proven that the sensitivity of cellulose solutions to oxygen results in a reduction in the viscosity of the solution in which oxygen is present. While it has been heretofore suggested that air or oxygen might be excluded with some advantage prior to and during the manufacture of alkaline cellulose solutions, none of the prior proposals succeeded in attaining its objective, and as a result it has not heretofore been possible to obtain a cellulose solution having the desired high order of viscosity.

An exact explanation for the decrease in viscosity of an alkaline cellulose solution due to the presence of oxygen is not known. The most plausible theory is that in the presence of oxygen a partial decomposition of the cellulose molecule occurs. By preventing the decomposition of the cellulose molecule and maintaining the cellulose in the solution in undecomposed form, highly viscous solutions may be maintained. Highly viscous solutions of cellulose possess considerable value in certain industries such, for example, as in the manufacture of artificial silk. The strength of artificial silk depends upon the viscosity of the original cellulose solution. Where the viscosity of the solution is low, the tensile strength of the articial silk thread is reduced and its value correspondingly destroyed.

A general object of the present invention is to provide an improved process for preparing alkaline cellulose solutions having a higher viscosity than could heretofore be obtained. To this end, the invention contemplates an improved process wherein oxygen is effectively and completely excluded during the preparation of the cellulose solution. These and other features of the invention, and of the novel process referred to, will be fully described in the following specification and will be pointed out in detail in the appended claims.

According to the present invention, every effort is made to exclude oxygen from entering into the process steps and any oxygen which may enter is eliminated. As an initial step, the raw material entering into the process is treated to remove any oxygen which might be contained therein. This may be accomplished by boiling the raw material with water, subjecting the raw material to a vacuum, or adding reducing agents such as alkaline ammoniacal solutions of cuprous chloride $Cu_2Cl_2$, cuprous oxide $Cu_2O$, pyrogallol, or similar reducing compounds. Mixtures of these and other reducing agents may also be used.

After rendering the raw material substantially oxygen-free, the cellulose solution itself is treated so as to remove any contained oxygen. This is accomplished by the addition of any convenient and suitable reducing agents.

A third vital step of the present process consists in the complete removal of oxygen from the reaction vessel within which the solution is prepared. The removal of the oxygen from the reaction vessel is accomplished by carefully scavenging the vessel with absolutely oxygen-free inert gases, such as nitrogen and hydrogen.

Each of the treatment-steps described are essential for the complete success of the process, the desired result failing of full accomplishment if one of the steps be omitted. When, however, the process in its entirety is followed, oxygen is completely and effectively eliminated throughout the process, and a cellulose solution having a viscosity of a high order heretofore unknown is obtained.

The following table which is based on the result of extensive experiments shows the effect of oxygen on the viscosity of cellulose solutions. It will be apparent from the table that the viscosity of the cellulose solutions obtained is higher as the oxygen is more completely excluded. The viscosity of the solutions is measured in accordance with the standard method and is given in centipoise (C. P.).

Table I

| | Centipoise |
|---|---|
| 1. Cellulose solutions manufactured in the atmospheric oxygen. (No nitrogen applied to scavenge oxygen) | 3.6 |
| 2. Cellulose solution manufactured in closed bombs. Nitrogen with 2.4% oxygen content used in the reaction vessel | 49.6 |
| 3. Cellulose solution manufactured in closed bombs. Nitrogen with 0.7% oxygen content used in the reaction vessel | 172.7 |
| 4. Cellulose solutions manufactured in closed reaction vessel. Nitrogen completely free from oxygen used in the vessel | 248.0 |
| 5. Cellulose solution prepared as in test No. 4. The contents of the reaction vessel boiled out to more completely eliminate oxygen | 281.4 |
| 6. Cellulose solution prepared as in test No. 4. Contents additionally boiled out under a vacuum for fifteen minutes to more completely eliminate oxygen | 316.7 |
| 7. Cellulose solution prepared as in test No. 4. In addition cuprous chloride, $Cu_2Cl_2$, to the amount of 0.1 gr. added to take up any remaining oxygen | 800.0 |
| 8. Cellulose solution produced as in test No. 4. In addition cuprous chloride, $Cu_2Cl_2$, to the amount of 0.3 gr. added to take up any remaining oxygen | 893.1 |
| 9. Cellulose solution produced as in test No. 6. In addition, 0.5 grs. of cuprous chloride, $Cu_2Cl_2$ is added to take up any remaining oxygen | 928.4 |

It will be observed from the above table that a distinct diminution of the viscosity of the resulting solution occurs even when oxygen is present only in very small quantities. In the tests of this table no oxygen was present except in gaseous form.

Experiments have also been made in the production of cellulose solutions wherein oxygen in gaseous form was absolutely excluded, but where definite amounts of active or nascent oxygen, in the form of a 1% ammonium persulphate solution, were added to the solution. The results obtained proved that active oxygen, even in such small amounts as 0.007% of the weight of the dissolved cellulose, which corresponds to 0.00071 atoms of oxygen for every molecule of the basic cellulose, $(C_6H_{10}O_5)x$, causes a marked decrease in viscosity. The results of this series of tests are indicated in the following table:

Table II

| cc. of 1% $(NH_4)_2S_2O_8$ solution | Active oxygen present in grams | Percent active oxygen by weight with respect to quantity of cellulose | Mean value of viscosity of resulting solution in C. P. |
|---|---|---|---|
| 15 | 0.01050 | 1.050 | 6 |
| 10 | 0.00700 | 0.700 | 5.8 |
| 7.5 | 0.00525 | 0.525 | 13.9 |
| 5 | 0.00350 | 0.325 | 266 |
| 2.5 | 0.00175 | 0.175 | 447 |
| 1 | 0.00070 | 0.070 | 629 |
| 0.1 | 0.00007 | 0.007 | 650 |
| 0 | 0.0 | 0. | 731 |

The cellulose-cupro-ammonium solutions, obtained by the complete exclusion of oxygen, are extremely stable, are practically unlimited in durability and may be kept indefinitely. It is essential, however, that active light be excluded as far as possible during the manufacture of the solutions, and in the storage space in which the solutions are kept.

Tests have been made on the manufacture of cellulose xanthate (xanthogenate) solutions wherein an oxygen-absorbing material, such as pyrogallol is employed. The following table shows how the viscosity of the xanthogenate solutions may be increased by following the steps of the disclosed process and using pyrogallol to absorb any remaining oxygen.

Table III

| | Centipoise |
|---|---|
| 1. Solution boiled out in a vacuum. Nitrogen absolutely free from oxygen applied to the reaction vessel, pyrogallol used to take up any remaining oxygen | 2376 |
| 2. Nitrogen absolutely free from oxygen applied to the reaction vessel. 0.5 grams of pyrogallol used to take up remaining oxygen | 2309 |
| 3. Nitrogen absolutely free from oxygen applied to the reaction vessel. 0.2 grams of pyrogallol used to take up remaining oxygen | 1408 |
| 4. Solution prepared and boiled out in a vacuum. Nitrogen absolutely free from oxygen used in the reaction vessel | 1082 |
| 5. The nitrogen absolutely free from oxygen used in the reaction vessel | 1020 |
| 6. Solution prepared in contact with atmospheric air. No special agents used to reduce the quantity of oxygen | 733 |

As starting materials, it is desirable to use substances which contain cellulose in undecomposed form such, for example, as cotton and linters. The raw materials used are initially cleaned by heating with lyes in the absence of air so as to reduce the quantity of oxygen. Other satisfactory starting materials are cellulose material which has been converted to a very high alpha cellulose content by boiling with lyes while excluding oxygen.

Example 1

Clean raw cotton, linters, or similar material, is boiled with water in a vacuum for approximately thirty minutes. Oxygen-free nitrogen is then entered into the boiler or containing vessel. Copper hydroxide and cuprous oxide are then added in the proportion of 1.3 parts of copper hydroxide and 0.2 parts of cuprous oxide to one part by weight of the cellulose material. Air is excluded during this treatment. While still excluding air, and avoiding the entrance of active light, the necessary quantity of ammonia is added and the mixture stirred until the cellulose is completely dissolved in the reagent. The exclusion of air is preferably accomplished by passing a stream of clean nitrogen through the apparatus.

Example 2

Commercial bleached cellulose is boiled with water under vacuum to eliminate dissolved air as much as possible. A concentrated solution of sodium hydroxide is added. During this step the admission of air to the reaction vessel is avoided by flowing oxygen-free nitrogen into the vessel. A lye of 17.5% to 18% concentration is obtained. Pyrogallol in the proportion of 0.3 parts by weight is now added to the mixture and stirred therewith. The surplus lye is filtered off in a stream of nitrogen gas. Carbon disulphide is then added to the mixture which is stirred until the reaction is completed, the surplus carbon disulphide being absorbed in the vacuum and nitrogen stream. A solution having any desired content of cellulose and lye may be obtained.

Example 3

The starting material is a cellulose material which has been converted into an alpha cellulose of 95% to 96% concentration by treatment with sodium hydroxide. This starting material is boiled with water in a vacuum. Oxygen-free nitrogen is poured into the reacting vessel. Thereafter, a sufficient quantity of concentrated sodium hydroxide is added, the quantity of sodium hydroxide being determined by the lye content of the prepared solution. Pyrogallol is added in sufficient amount to take up any remaining oxygen. Carbon disulphide is added and stirred into the mixture for approximately six hours. The surplus carbon disulphide is evaporated in the vacuum or removed in the stream of gaseous nitrogen. The solution is then diluted with water, precaution being taken to exclude air from the vessel here as throughout the entire process. When the desired lye and cellulose concentration are obtained by the dilution, the cellulose solution may be stored.

The disclosed process results in a cellulose solution having a higher viscosity than is obtainable by any of the prior processes heretofore followed.

Having thus described the invention, what I claim as new and desire to obtain by Letters Patent is:

1. A process for the preparation of cellulose solutions of relatively high viscosity which comprises the steps of treating cellulose to remove substantially all the uncombined oxygen contained therein, removing substantially all the free oxygen from the interior of the reaction vessel in which the desired solution is to be prepared, preparing said desired solution by adding to the cellulose, in said reaction vessel, a solvent thereof, and treating said cellulose material and said solvent for the purpose of removing substantially all the additional small quantity of free oxygen remaining therein, the entire dissolving operation being carried out in substantially complete absence of free oxygen.

2. A process as described in claim 1 in which said cellulose is treated with said solvent in an atmosphere comprising an oxygen-free gas which does not react appreciably with the contents of said reaction vessel.

3. A process as set forth in claim 1 in which said solvent is added to said cellulose in an atmosphere of oxygen-free nitrogen.

4. A process as set forth in claim 1 in which the additional small quantity of free oxygen remaining in said cellulose and said solvent is removed by the introduction into said reaction vessel of a material which will absorb substantially all said additional small quantity of free oxygen remaining therein.

5. A process as set forth in claim 1 in which the small quantity of free oxygen remaining in the mixture of said cellulose material and said solvent in said reaction vessel is removed by adding to said mixture a cuprous compound which has the property of absorbing substantially all the free oxygen remaining.

6. A process as set forth in claim 1 in which substantially all the small quantity of free oxygen remaining in the mixture of said cellulose material and said solvent is removed by the addition to said mixture of cuprous oxide.

7. A process as set forth in claim 1 in which substantially all the small quantity of free oxygen remaining in the mixture of said cellulose material and said solvent is removed by the addition to said mixture of a material selected from the group which consists of cuprous chloride, cuprous oxide and pyrogallol.

EMIL SCHELLER.